(12) United States Patent
Kobayashi

(10) Patent No.: US 11,408,735 B2
(45) Date of Patent: Aug. 9, 2022

(54) POSITIONING SYSTEM AND POSITIONING METHOD

(71) Applicant: Rohm Co., Ltd., Kyoto (JP)

(72) Inventor: Tadashi Kobayashi, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 707 days.

(21) Appl. No.: 16/235,110

(22) Filed: Dec. 28, 2018

(65) Prior Publication Data

US 2019/0212146 A1 Jul. 11, 2019

(30) Foreign Application Priority Data

Jan. 5, 2018 (JP) .............................. JP2018-000714

(51) Int. Cl.
| | |
|---|---|
| G01C 19/5776 | (2012.01) |
| G01C 17/02 | (2006.01) |
| G01C 19/56 | (2012.01) |
| G01P 15/00 | (2006.01) |
| G06F 3/0346 | (2013.01) |
| G06F 3/01 | (2006.01) |

(52) U.S. Cl.
CPC ......... G01C 19/5776 (2013.01); G01C 17/02 (2013.01); G01C 19/56 (2013.01); G01P 15/00 (2013.01); G06F 3/017 (2013.01); G06F 3/0346 (2013.01)

(58) Field of Classification Search
CPC .... G01C 19/5776; G01C 17/02; G01C 19/56; G01P 15/00; G06F 3/017; G06F 3/0346
USPC ........................................................... 702/94
See application file for complete search history.

(56) References Cited

U.S. PATENT DOCUMENTS

| | | | | |
|---|---|---|---|---|
| 2017/0282363 | A1* | 10/2017 | Yamada | .................. B25J 9/1612 |
| 2018/0356227 | A1* | 12/2018 | Kim | ...................... G05B 19/401 |
| 2019/0120627 | A1* | 4/2019 | Ohyama | ............ G01C 19/5776 |
| 2020/0206568 | A1* | 7/2020 | Hong | .................. G09B 19/0038 |

FOREIGN PATENT DOCUMENTS

| | | |
|---|---|---|
| JP | 2009-507272 | 2/2009 |
| JP | 2011-070341 | 4/2011 |
| JP | 2012-173190 | 9/2012 |
| JP | 2016-133343 | 7/2016 |

* cited by examiner

Primary Examiner — Michael P Nghiem
(74) Attorney, Agent, or Firm — Fish & Richardson P.C.

(57) ABSTRACT

A positioning system includes: a gyro sensor configured to detect an angular velocity of a moving body; a geomagnetic sensor configured to detect a direction in which the moving body is placed; an acceleration sensor configured to detect an acceleration of the moving body; and a gyro sensor output correction part configured to correct an output of the gyro sensor, wherein the gyro sensor output correction part is configured to convert output components of the gyro sensor into at least one of a rotation matrix and a quaternion based on output components of the geomagnetic sensor and output components of the acceleration sensor, and to calculate a posture of the moving body based on the rotation matrix or the quaternion.

20 Claims, 10 Drawing Sheets

POSITIONING SYSTEM AND POSITIONING METHOD

CROSS-REFERENCE TO RELATED APPLICATION

This application is based upon and claims the benefit of priority from Japanese Patent Application No. 2018-000714, filed on Jan. 5, 2018, the entire contents of which are incorporated herein by reference.

TECHNICAL FIELD

The present disclosure relates to a positioning system and a positioning method.

BACKGROUND

Recently, technical developments such as automatic driving or advanced driving assistant system (ADAS) of vehicles are active and have been required to calculate an azimuth angle or an inclination angle of a moving body. The requirement for such technical developments is the same for electronic devices such as mobile phones, smartphones, tablet terminals, car navigation systems, digital cameras, and computer graphics (CG), as well as vehicles, ships and aircraft. In these electronic devices or the like, it is necessary to accurately recognize a posture of a moving body such as a direction or inclination and change in the posture in real time.

In a related art, a positioning system includes a gyro sensor, an acceleration sensor, a global positioning system (GPS) signal receiver, and an arithmetic controller. Based on data output from the gyro sensor, the acceleration sensor, and the GPS signal receiver, the arithmetic controller performs error estimation and error correction of a position, a velocity, a posture, a gyro sensor bias, and an acceleration sensor bias of a moving body.

Main components of the arithmetic controller include a bias correction part, a posture calculation part, a coordinate conversion part, a position/velocity calculation part, an error correction part, and an extended Kalman filter operation part.

The extended Kalman filter operation part estimates a gyro bias error, an acceleration bias error, a position error, a velocity error, and an azimuth error using a multiplicative quaternion error model, based on a position and velocity calculated by the position/velocity calculation part and posture data calculated by the posture calculation part.

In the related art, a posture angle detection device, which detects a posture of a moving body with high precision by preventing accumulation of an integration error of an angular velocity sensor, includes the angular velocity sensor, an acceleration sensor, and an acceleration posture angle calculation means. The posture angle detection device further includes means for performing normalization and orthogonalization of an angular velocity posture matrix from an angular velocity low pass filter.

In the related art, a mobile device includes a GPS sensor, an acceleration sensor, a direction sensor, a map information acquisition part, a three-dimensional (3D) data storage part, and a 3D image data generation part. In order to express a posture of the mobile device, a quaternion is generated based on an azimuth value detected from the acceleration sensor. Specifically, first, a gravity direction vector, when viewed from the mobile device, is obtained based on a value obtained by the acceleration sensor. Then, a quaternion q1 is obtained so that (0, −1, 0) downward in a 3D space matches the gravity direction vector. Further, a quaternion q2 which is oriented in a direction of a value obtained from an azimuth sensor is obtained using, for example, the north (0, 0, −1) in the 3D space as a reference, and a quaternion q indicating the posture is obtained by multiplying the quaternions q1 and q2. The quaternion q thus generated may be expressed in a form of, for example, (x, y, z, w).

In the related art, in order to accurately detect an azimuth angle, an azimuth sensor, i.e., a geomagnetic sensor, is required to detect a true geomagnetism by cancelling an offset caused by a magnetic field generated in a set equipped with the azimuth sensor or a magnetic field generated by a strong magnet or the like placed around the azimuth sensor, or an offset caused by performance of the azimuth sensor itself.

FIG. 10 is a block diagram illustrating an overview of a positioning system according to a related art. A positioning system 1 includes an arithmetic controller 10, a gyro sensor 20, an acceleration sensor 30, a GPS signal receiver 40, and a storage part 50. Based on data output from the gyro sensor 20, the acceleration sensor 30, and the GPS signal receiver 40, the arithmetic controller 10 performs error estimation and error correction of a position, a velocity, a posture, a gyro sensor bias, and an acceleration sensor bias of a moving body, and outputs the result to an output part such as a display part 61 and a driving device 62 of the moving body to control the moving body. The positioning system illustrated in FIG. 10 performs estimation of a gyro bias error and an acceleration bias error, a position error, a velocity error, and an azimuth error by an extended Kalman filter operation part based on inertial sensor data and GPS positioning data, and uses a GPS signal as the positioning system.

The related art mentioned above is a combination of the GPS and the gyro sensor (angular velocity sensor) with some exception. A moving body including the gyro sensor has a problem that an absolute angle of the azimuth angle or inclination angle of a moving body cannot be calculated accurately and in real time, when the moving body is located indoors or in a tunnel where the GPS signal cannot be received or the moving body is in a stationary state. The moving body in the stationary state further has a problem that accuracy of GPS measurement data is reduced.

SUMMARY

The present disclosure provides some embodiments of a positioning system and a positioning method that overcome problems existing in a conventional positioning system including a gyro sensor.

According to one embodiment of the present disclosure, a positioning system includes: a gyro sensor configured to detect an angular velocity of a moving body; a geomagnetic sensor configured to detect a direction in which the moving body is placed; an acceleration sensor configured to detect an acceleration of the moving body; and a gyro sensor output correction part configured to correct an output of the gyro sensor, wherein the gyro sensor output correction part is configured to convert output components of the gyro sensor into at least one of a rotation matrix and a quaternion based on output components of the geomagnetic sensor and output components of the acceleration sensor, and to calculate a posture of the moving body based on the rotation matrix or the quaternion; perform normalization and orthogonalization on the output components of the gyro sensor by adding the output components of the geomagnetic sensor and the output components of the acceleration sensor to a part of the output components of the gyro sensor, and then to convert the output components of the gyro sensor into the rotation matrix or the quaternion.

According to one embodiment of the present disclosure, a method of positioning a moving body having a gyro sensor, a geomagnetic sensor, and an acceleration sensor, includes: expressing an output vector of the gyro sensor by a first rotation matrix and expressing an output vector of the geomagnetic sensor and an output vector of the acceleration sensor by a second rotation matrix; calculating an acceleration correction coefficient α having a value within a range of 0 to 1.0, based on scalar quantities of an x axis component, a y axis component, and a z axis component of the output vector of the acceleration sensor; calculating a geomagnetic correction coefficient β using an offset or a dip angle of the geomagnetic sensor; smoothing or averaging the x axis component, they axis component, and the z axis component of the output vector of the acceleration sensor using the acceleration correction coefficient α; performing an outer product operation of the output vector of the acceleration sensor and the output vector of the geomagnetic sensor using the geomagnetic correction coefficient β; expressing a result of the outer product operation by a third rotation matrix; converting the third rotation matrix into a quaternion; and measuring a posture of the moving body based on the quaternion.

DETAILED DESCRIPTION

In the present disclosure, the terms a moving body, a rotating body, and a motion body are almost synonymously used. The moving body, the rotating body, and the motion body include an object having a function of calculating a position, a velocity, a posture, or the like of the object itself, for example, an electronic device such as a smartphone, a game machine, an aircraft, a ship, a vehicle, and the like. In the present disclosure, a positioning system refers to a system having at least a function of detecting an angular velocity of the moving body. In the present disclosure, a positioning method refers to a process for detecting at least an angular velocity and a posture in the positioning system. In addition, a gyro sensor and an angular velocity sensor are synonymous, and a geomagnetic sensor and an azimuth sensor are also synonymous. For example, the phrase "output of the gyro sensor" refers to an output of the gyro sensor expressed by at least one of an angular velocity, a quaternion, and a rotation matrix. The same is applies to the geomagnetic sensor and an acceleration sensor. That is to say, the meaning of the term "output" includes, in addition to signals directly output from various sensors, those obtained by applying a quaternion, a rotation matrix, smoothing, and normalization to the output signals. In addition, the term "posture" refers to an angle indicating an inclination of the moving body with respect to a ground surface.

(Embodiment)

Figure 1:
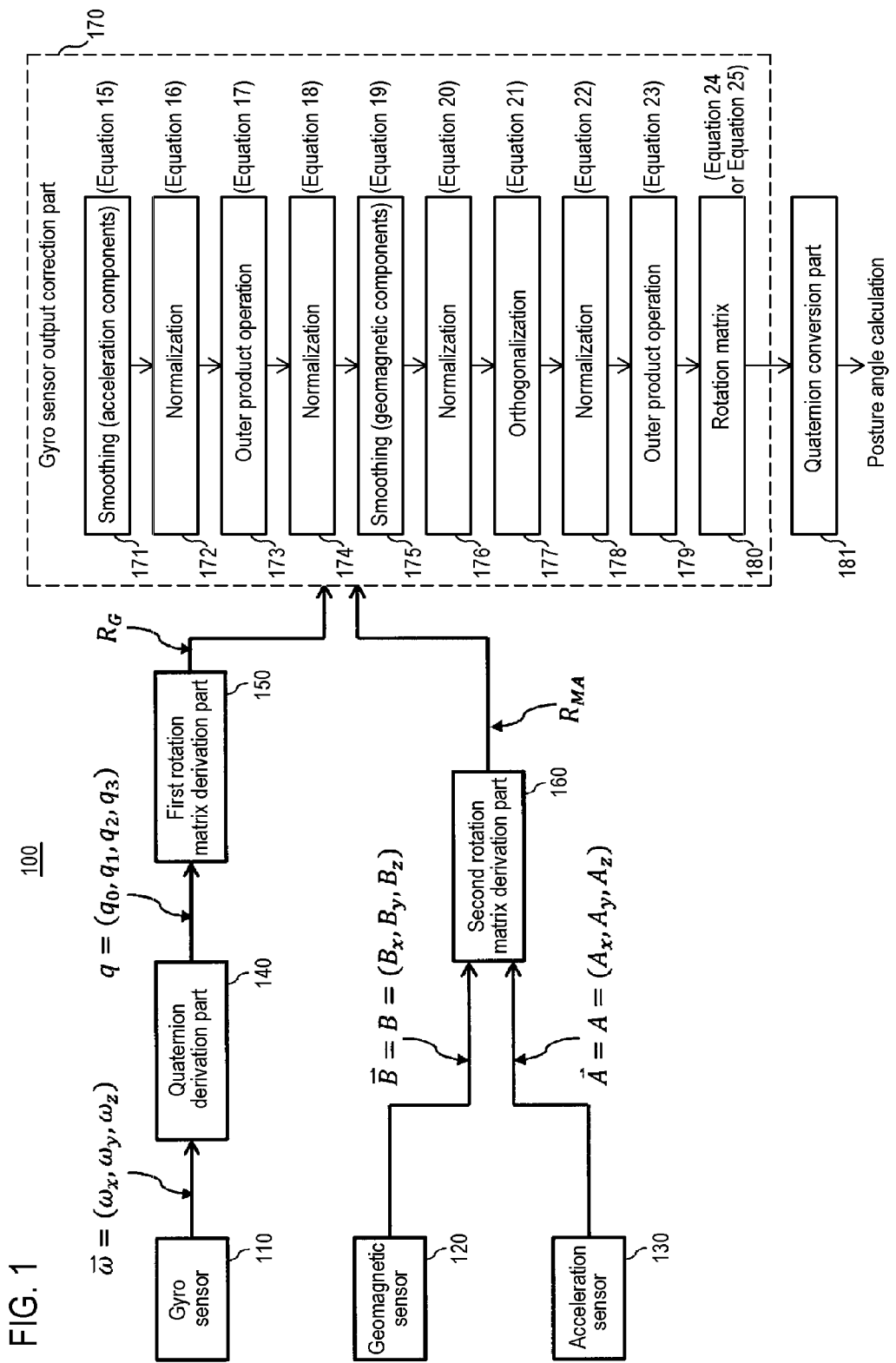
FIG. 1 is a block diagram illustrating a positioning system according to an embodiment of the present disclosure.

FIG. 1 is a block diagram illustrating an overview of a positioning system according to an embodiment of the present disclosure. A positioning system 100 includes a gyro sensor (angular velocity sensor) 110, a geomagnetic (azimuth) sensor 120, an acceleration sensor 130, a quaternion derivation part 140, a first rotation matrix derivation part 150, a second rotation matrix derivation part 160, and a gyro sensor output correction part 170. The positioning system 100 further includes a central processing unit (CPU) (not illustrated) as a part of an arithmetic controller. The quaternion derivation part 140, the first rotation matrix derivation part 150, the second rotation matrix derivation part 160, and the gyro sensor output correction part 170 constitute parts of the arithmetic controller. The arithmetic controller of the positioning system 100 further includes a storage part. The storage part stores a program (algorithm) to be executed by the positioning system 100. The positioning system 100 may further include a display part (not shown). The positioning system 100 may be integrated on a single semiconductor substrate. One of the features of the positioning system 100 is that a GPS sensor is not an essential component.

The gyro sensor 110 is mounted on a moving body such as a vehicle, an electronic device such as a smartphone, an augmented reality (AR) device, a virtual reality (VR) device, or the like. The gyro sensor 110 detects a rotational angular velocity and an angle of an electronic device using, for example, a vibrating tuning fork type sensor which uses a Coriolis force, a micro electro mechanical system (MEMS) sensor manufactured by microfabricating a semiconductor substrate, or the like.

Similar to the gyro sensor 110, the geomagnetic sensor 120 is mounted on the moving body such as a vehicle, and may be configured by, for example, a magneto impedance element (MI element), a Hall element, a magnetoresistance element, or the like. The geomagnetic sensor 120 may detect three-dimensional (3D) (x, y, z) magnetic components of an x axis, a y axis, and a z axis, when measuring a reference magnetism of geomagnetism along a specific 3D coordinate system. In general, the MI element is adopted in view of miniaturization, responsiveness, sensitivity, and accuracy.

Similar to the gyro sensor 110 and the geomagnetic sensor 120, the acceleration sensor 130 is mounted on the moving body. For example, a MEMS sensor, an electrostatic capacity type sensor, a piezoresistive type sensor, or a thermal detection type sensor may be used. The gyro sensor 110, the geomagnetic sensor 120, and the acceleration sensor 130 may be integrated on a single semiconductor substrate.

The quaternion derivation part 140 converts an output of the gyro sensor 110 into a quaternion format. The quaternion derivation part 140 is prepared as one of the operation processes before reaching the first rotation matrix derivation part 150 in a subsequent stage. By expressing output components of the gyro sensor 110 by a quaternion, it is possible to obtain a merit that a posture of the moving body can be expressed by four numerical values. Alternatively, the output components of the gyro sensor 110 may be directly input to the first rotation matrix derivation part 150 without passing through the quaternion derivation part 140.

The quaternion expresses a rotation in a 3D space by four components of a rotation axis (vector) and a rotation angle (scalar). The quaternion in each related art mentioned above is widely used to express a movement in the 3D space in game machines, computer graphics (CG), and AR or VR devices, in addition to the positioning system and the gyro sensor.

The positioning system 100 according to the embodiment of the present disclosure includes the gyro sensor 110. Here, when an output of angular velocities about an x axis, a y axis, and a z axis of the gyro sensor 110 is expressed by Eq. (1) and a minute angle of rotation about the angular velocity vector is expressed by Eq. (2), the quaternion may be expressed by Eq. (3).

$$\vec{\omega} = (\omega_x, \omega_y, \omega_z) \quad \text{Eq. (1)}$$

$$(|\vec{\omega}|\Delta t) \quad \text{Eq. (2)}$$

$$q = \left( \cos\left(\frac{|\vec{\omega}|\Delta t}{2}\right), \frac{\omega_x}{|\vec{\omega}|}\sin\left(\frac{|\vec{\omega}|\Delta t}{2}\right), \frac{\omega_y}{|\vec{\omega}|}\sin\left(\frac{|\vec{\omega}|\Delta t}{2}\right), \frac{\omega_z}{|\vec{\omega}|}\sin\left(\frac{|\vec{\omega}|\Delta t}{2}\right) \right) = \quad \text{Eq. (3)}$$

$$(q_0, q_1, q_2, q_3)$$

In the four components $q_0$, $q_1$, $q_2$, and $q_3$ used in the quaternion format of Eq. (3), $q_0$ represents a scalar part, and $q_1$, $q_2$, and $q_3$ represent a vector part.

The above Eq. (3) almost completely represents a 3D rotation of an object. However, a drift error and a time integration error occur in the output of the gyro sensor 110 when performing an integration process for obtaining an angle from an angular velocity. Therefore, it is important to continue to correct the output of the gyro sensor 110. Here, the drift error refers to an output of the gyro sensor 110 when there is no input angular velocity. Further, the time integration error refers to an error that occurs when the integration process (low pass filter process) is performed.

The embodiment of the present disclosure converts the expression by the quaternion illustrated in Eq. (3) into a format of a rotation matrix, performs a predetermined correction on components of the rotation matrix, and then converts the rotation matrix again into the expression of the quaternion. Here, a microrotation matrix $R_\Delta$ may be expressed by Eq. (4) using the quaternion q.

$$R_\Delta = \begin{pmatrix} 1 - 2q_2^2 - 2q_3^2 & 2(q_1q_2 - q_3q_0) & 2(q_1q_3 + q_2q_0) \\ 2(q_1q_2 + q_3q_0) & 1 - 2q_1^2 - 2q_3^2 & 2(q_2q_3 - q_1q_0) \\ 2(q_1q_3 - q_2q_0) & 2(q_2q_3 + q_1q_0) & 1 - 2q_1^2 - 2q_2^2 \end{pmatrix} \quad \text{Eq. (4)}$$

A relationship between a rotation matrix $R_G$ (t) at time t and a rotation matrix $R_G$ (t+Δt) after minute time Δt, i.e., at time t+Δt, may be expressed by Eq. (5). By expressing an initial value $R_G$ of the rotation matrix by Eq. (6), a temporal transition of rotation of the gyro sensor 110 may be almost exactly expressed.

$$R_G(t + \Delta t) = R_G(t)R_\Delta \quad \text{Eq. (5)}$$

$$R_G(0) = \begin{pmatrix} 1 & 0 & 0 \\ 0 & 1 & 0 \\ 0 & 0 & 1 \end{pmatrix} \quad \text{Eq. (6)}$$

The first rotation matrix derivation part 150 is disposed at the subsequent stage of the quaternion derivation part 140. The first rotation matrix derivation part 150 expresses the output components of the gyro sensor 110 by a rotation matrix. Essentially, a quaternion and a rotation matrix express substantially the same posture of a moving body. However, the rotation matrix has a merit that the posture of the moving body can be simply expressed. Therefore, in the embodiment of the present disclosure, the output components of the gyro sensor 110 are expressed by a rotation matrix so that the state of the posture can be easily recognized. The first rotation matrix derivation part 150 may be omitted when the quaternion derivation part 140 is prepared.

In the above description, the process of expressing the output of the gyro sensor 110 by the quaternion and the rotation matrix has been illustrated. However, it is not sufficient to calculate an azimuth angle and an inclination angle of the moving body using the output of the gyro sensor 110 due to generation of an integration error. Therefore, in the embodiment of the present disclosure, attempts are made to correct the output of the gyro sensor 110 based on outputs of the geomagnetic sensor 120 and the acceleration sensor 130. The concept itself of correcting the output of the gyro sensor with the output of the acceleration sensor or the like is conventionally known.

The second rotation matrix derivation part 160 converts the outputs of the geomagnetic sensor 120 and the acceleration sensor 130 into a rotation matrix. The rotation matrix derived from the second rotation matrix derivation part 160 is indicated by a reference symbol $R_{MA}$. The second rotation matrix derivation part 160 is prepared for matching the expression form with the first rotation matrix derivation part 150 installed at the subsequent stage of the gyro sensor 110. The second rotation matrix derivation part 160 is not an essential component, and for example, the outputs from the geomagnetic sensor 120 and the acceleration sensor 130 may be directly input to the gyro sensor output correction part 170 at the subsequent stage. In any case, the rotation matrix has a merit that the posture angle of the moving body can be simply expressed.

Figure 2:
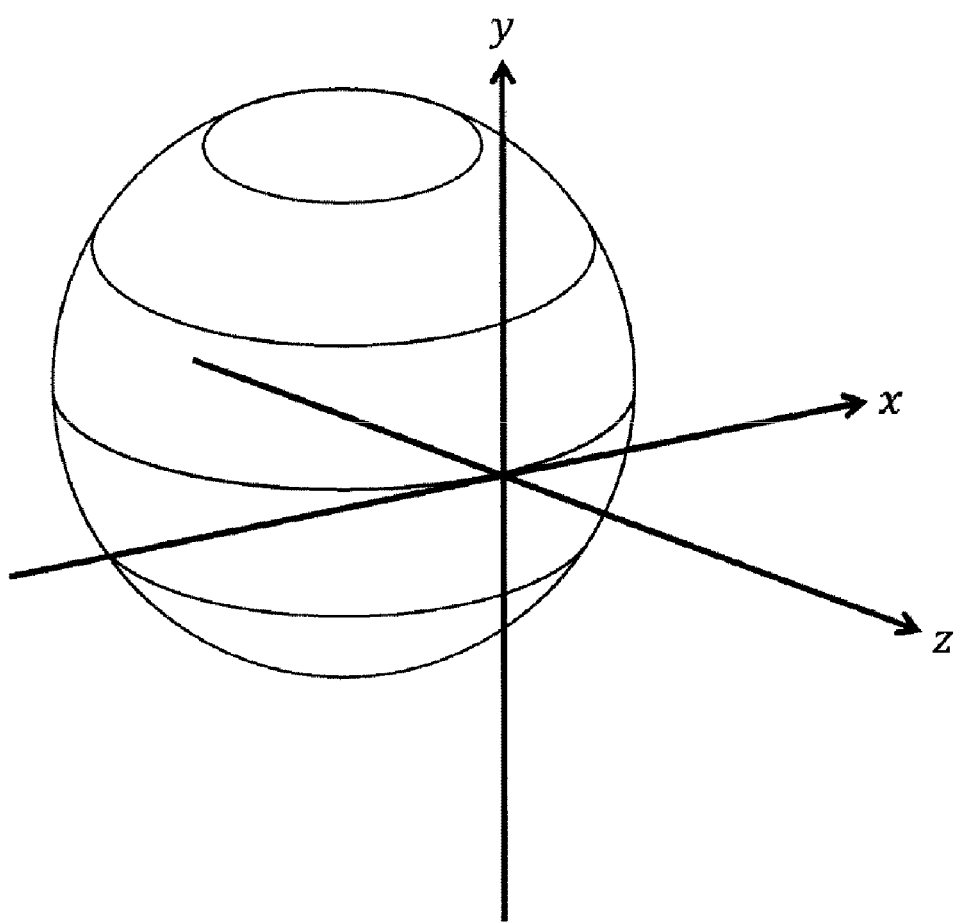
FIG. 2 is a coordinate system of a rotation vector used to illustrate a geomagnetic sensor and an acceleration sensor according to an embodiment of the present disclosure.

FIG. 2 illustrates a coordinate system of rotation vector prepared for expressing the outputs of the geomagnetic sensor 120 and the acceleration sensor 130 by a rotation matrix. Hereinafter, FIG. 2 will be described with reference to FIG. 1. In FIG. 2, the z axis indicates a gravity direction with respect to a ground surface sensed by the acceleration sensor 130, the y axis indicates a magnetic north direction sensed by the geomagnetic sensor 120, and the x axis indicates a direction orthogonal to the z axis and the y axis. Here, for the convenience of description, the x axis indicates an east direction (eastward). Depending on an environment where the moving body is located or the type of the moving body, the x axis may indicate westward. Here, the "magnetic north" indicates a direction pointed by the N pole of a compass, and is distinguished from a "true north," i.e., a north end of the rotation axis of the earth (90 degrees north latitude). Since a predetermined relationship is established between the value of "magnetic north" and the value of "true north," if one value is known, it is easy to calculate the other. Therefore, in the embodiment of the present disclosure, the "magnetic north" and the "true north" may be regarded as synonymous. The "magnetic north" may be replaced with a "magnetic south," and the "east direction" may be replaced with a west direction, i.e., "westward."

When the output vector of the geomagnetic sensor 120 is $B=(B_x, B_y, B_z)$ and the output vector of the acceleration sensor 130 is $A=(A_x, A_y, A_z)$ in FIG. 2, a vector H orthogonal to the plane including the vector A and the vector B, i.e., an east (x axis) vector H, may be expressed as $H=A\times B$ or $H=B\times A$. Further, when a vector M orthogonal to the plane including the vector A and the vector H, i.e., a vector M in the magnetic north direction, is $M=A\times H$ or $M=H\times A$, the rotation matrix $R_{MA}$, which is an output component of the second rotation matrix derivation part 160, may be expressed as shown in Eq. (7).

$$R_{MA} = \begin{pmatrix} H_x & H_y & H_z \\ M_x & M_y & M_z \\ A_x & A_y & A_z \end{pmatrix} \quad \text{Eq. (7)}$$

Needless to say, since each element of the rotation matrix $R_{MA}$ expressed by the above Eq. (7) involves an acceleration component and a geomagnetic component, the rotation matrix $R_{MA}$ may be influenced by an external force or an external geomagnetism. Therefore, in order to correct the output of the gyro sensor 110 with the outputs of the geomagnetic sensor 120 and the acceleration sensor 130, the following two points should be taken into consideration. The first one is to improve calculation accuracy of the rotation matrix $R_{MA}$. The second one is to allow a sequential change in whether each of the geomagnetic sensor 120 and the acceleration sensor 130 is weighted in obtaining the rotation matrix $R_{MA}$ according to the type of the moving body, a use environment of the moving body, or the like.

In order to reduce the integration error of the vector components of the rotation matrix $R_G$ output from the first rotation matrix derivation part 150 installed on the gyro sensor 110 side, in some embodiments, the vector components of the rotation matrix $R_G$ are corrected when the accuracy of the rotation matrix $R_{MA}$ obtained by the second rotation matrix derivation part 160 is high, i.e., when an external force applied to the moving body is small and the influence of an external magnetic field is small. In addition, when correcting the vector components of the rotation matrix $R_G$, it is necessary to prepare correction coefficients based on the outputs of the geomagnetic sensor 120 and the acceleration sensor 130. Further, in order to perform various operations using the correction coefficients, it is necessary to make it easy to use each output based on a certain rule, i.e., to perform normalization and orthogonalization of each output. These will be described below.

First, the vector of the acceleration components A ($A_x, A_y, A_z$) of the above Eq. (7) is noted. A scalar quantity of the acceleration components A may be expressed by Eq. (8). Here, assuming that the output of the acceleration sensor 130 is normalized to 1.0, since the gravity acceleration is almost detected when Eq. (8) is around 1.0, the output of the gyro sensor 110 may be suitably corrected. On the other hand, as the value of Eq. (8) moves away from 1.0, a force other than the gravity acts on the moving body, and the accuracy of correcting the output of the gyro sensor 110 is reduced.

$$|\vec{A}| = \sqrt{A_x^2 + A_y^2 + A_z^2} \quad \text{Eq. (8)}$$

A calculation of an acceleration correction coefficient $\alpha$ used for correcting the output of the gyro sensor 110 from the output of the acceleration sensor 130 will be described. The acceleration correction coefficient $\alpha$ may be expressed by Eq. (9) or Eq. (10). Here, $\alpha_{max}$ is a maximum value of the acceleration correction coefficient $\alpha$, wherein $0 \leq \alpha_{max} \leq 1.0$. Further, $c_0$ is a constant. The acceleration correction coefficient $\alpha$ may be set so that $\alpha = \alpha_{max}$ when the gravity acceleration is dominant and $\alpha \approx 0$ when an action other than the gravity acceleration is large. In some embodiments, the acceleration correction coefficient $\alpha$ may be suitably changed according to the type of the moving body, the use environment of the moving body, or the like.

$$\alpha = \frac{\alpha_{max}}{1 + c_0(1.0 - |\vec{A}|)^2}, \quad c_0: \text{constant} \quad \text{Eq. (9)}$$

$$\alpha = \alpha_{max} \text{sech}\{c_0(1.0 - |\vec{A}|)\}, \quad c_0: \text{constant} \quad \text{Eq. (10)}$$

The acceleration correction coefficient $\alpha$ may be calculated using "a function being convex upward" having the maximum acceleration correction coefficient $\alpha_{max}$ as a maximum value, instead of using the above Eqs. (9) and (10). That is to say, the acceleration correction coefficient $\alpha$ may be calculated based on, for example, a quadratic function or a cubic function that maximizes the acceleration correction coefficient $\alpha$ when the absolute value of the acceleration is 1.0. The function may be set such that the acceleration correction coefficient $\alpha$ is maximized at the absolute value of, for example, 0.5, instead of the absolute value of 1.0.

Next, a calculation of a geomagnetic correction coefficient $\beta$ used for correcting the output of the gyro sensor 110 from the output of the geomagnetic sensor 120 will be described. In order to calculate the geomagnetic correction coefficient $\beta$, a magnetic value after a magnetic offset correction is prepared.

In one embodiment of the present disclosure, description will be made on the assumption that the magnetic offset correction has been applied. A geomagnetic correction coefficient $\beta_0$ used for correcting the output of the gyro sensor 110 may be expressed by Eq. (11) with a vector of a peripheral magnetic field after the magnetic offset correction as $B_0$ and a vector of an external magnetic field as B.

$$\beta_0 = 1 - \frac{|\vec{B}|}{|\vec{B_0}|} \quad \text{Eq. (11)}$$

Assuming that $B_0 > B$ in Eq. (11), a maximum geomagnetic correction coefficient $\beta_{max}$, which is a maximum value of the geomagnetic correction coefficient $\beta$, is $\beta_{max} \approx 1.0$. In actual practice, an upper limit threshold of the maximum geomagnetic correction coefficient $\beta_{max}$ may be set so that the correction coefficient for correcting the output of the gyro sensor 110 can be changed according to the type of the moving body, the use environment of the moving body, or the like. The maximum geomagnetic correction coefficient $\beta_{max}$ is not limited to 1.0, but may be set to be an arbitrary value of 1.0 or less.

A method of calculating the geomagnetic correction coefficient $\beta_0$ by obtaining the peripheral magnetic field after the magnetic offset correction is expressed in Eq. (11). However, in another method, a dip angle may be used. Hereinafter, the method of calculating the geomagnetic correction coefficient using a dip angle $\gamma$ will be described.

Figure 3:
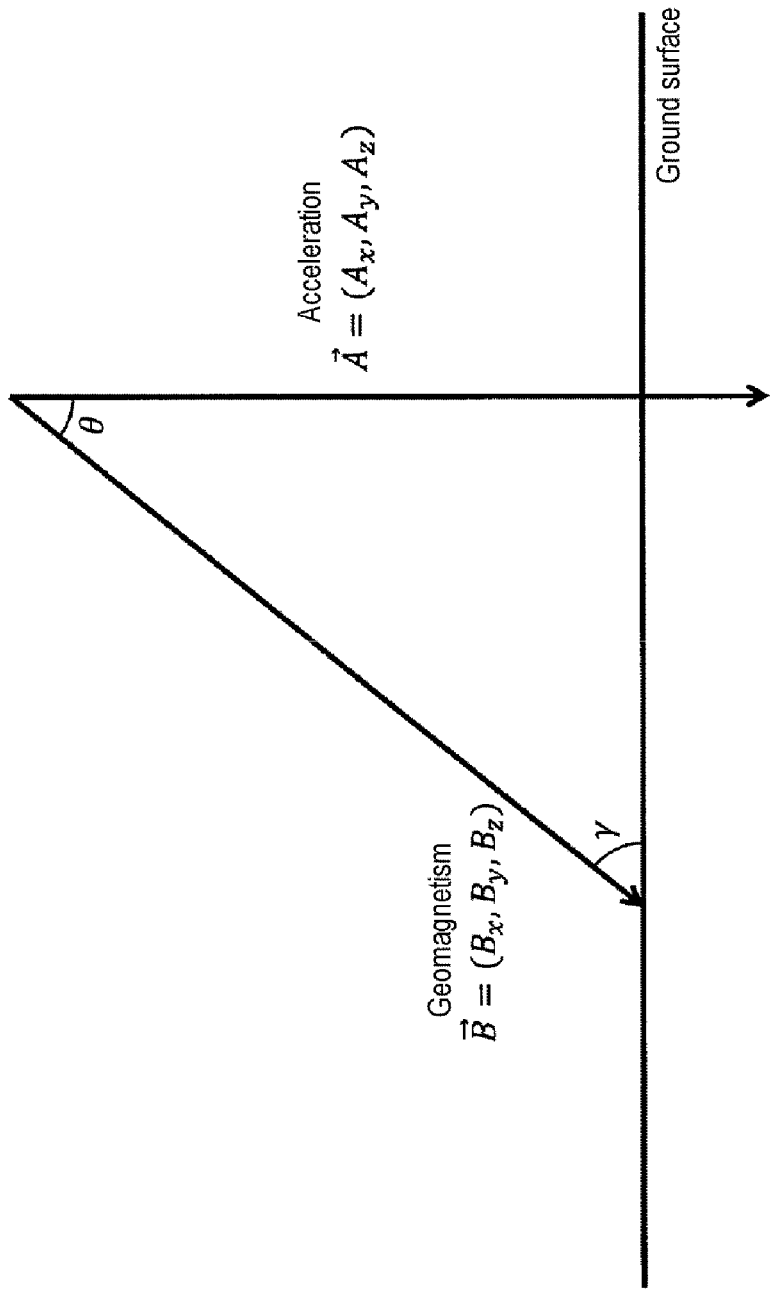
FIG. 3 is a vector diagram used to illustrate an inner product operation of the geomagnetic sensor and the acceleration sensor according to an embodiment of the present disclosure.

FIG. 3 illustrates a relationship among the vector A ($A_x$, $A_y$, $A_z$) output from the acceleration sensor 130, the vector B ($B_x$, $B_y$, $B_z$) output from the geomagnetic sensor 120, which are prepared for calculating the dip angle $\gamma$, and a ground surface. The dip angle $\gamma$ may be calculated based on an inner product (A·B) of the vectors A and B and an angle $\theta$ formed by the vectors A and B. The inner product operation of the two vectors A and B is made by an inner product operation of the offset-corrected geomagnetic components and acceleration components. Assuming that the angle formed by the two vectors A and B is $\theta$, the dip angle $\gamma$ may be expressed by Eqs. (12) and (13), and when the vector A and the vector B are orthogonal to each other, i.e., $\theta = \pi/2 = 90$ degrees, the scalar quantities of the vectors A and B become zero.

$$\vec{A} \cdot \vec{B} = A_x B_x + A_y B_y + A_z B_z = |\vec{A}||\vec{B}|\cos\theta \qquad \text{Eq. (12)}$$

$$\gamma = \frac{\pi}{2} - \theta = \frac{\pi}{2} - \cos^{-1}\left(\frac{A_x B_x + A_y B_y + A_z B_z}{|\vec{A}||\vec{B}|}\right) \qquad \text{Eq. (13)}$$

In order to use the dip angle $\gamma$ calculated by Eq. (13) as the geomagnetic correction coefficient, it is necessary to prepare a certain dip angle as a reference. One method is to adopt the magnetic offset correction value used in the related art. Another method is to utilize a dip angle library based on a position obtained from latitude and longitude information by GPS. Here, if the dip angle obtained by either of the above-described methods is referred to as a magnetic offset correction dip angle and a value of the magnetic offset correction dip angle is indicated by $\gamma_0$, a corrected geomagnetic correction coefficient $\beta_1$ may be calculated by Eq. (14).

$$\beta_1 = 1 - \frac{\gamma}{\gamma_0} \qquad \text{Eq. (14)}$$

However, since the acceleration sensor 130 should sense only the gravity, the measurement of the dip angle $\gamma$ may be performed when the moving body is in a stationary state, in a constant velocity motion, or in a small movement. It may be considered that, when the geomagnetic correction coefficient $\beta_1$ is close to 1.0, the influence of the external magnetic field is large, and when the geomagnetic correction coefficient $\beta_1$ is close to zero, the influence of the external magnetic field is small. In actual practice, an upper limit threshold of the geomagnetic correction coefficient $\beta_1$ may be set like the geomagnetic correction coefficient $\beta_0$. The upper limit threshold $\beta_{1max}$ may be set to be 1.0, or may be set to be 1.0 or less.

The acceleration correction coefficient $\alpha$ calculated by Eqs. (9) and (10) and the geomagnetic correction coefficients $\beta_0$ and $\beta_1$ calculated by Eqs. (11) and (14) are used as correction coefficients for obtaining a posture angle measured by the gyro sensor 110. The geomagnetic correction coefficients $\beta_0$ and $\beta_1$ may not be used as they are, but may be converted into a form of $\beta_{1max} - \beta$ ($\beta_0 = \beta_1$) or a form of $\beta/\beta_{1max}$ for use.

In addition, when correcting the output of the gyro sensor 110, the acceleration correction coefficient $\alpha$ and the geomagnetic correction coefficient $\beta$ may not be individually used, but may be converted into a product ($\alpha \cdot \beta$) or a quotient (($\beta/\alpha$) or ($\alpha/\beta$)) for use.

Returning back to FIG. 1, the gyro sensor output correction part 170 corrects each component of the rotation matrix $R_G$ calculated by the first rotation matrix derivation part 150 using the rotation matrix $R_{MA}$ calculated by the second rotation matrix derivation part 160. The gyro sensor output correction part 170 includes a smoothing part 171, a normalization part 172, an outer product operation part 173, a normalization part 174, a smoothing part 175, a normalization part 176, an orthogonalization part 177, a normalization part 178, an outer product operation part 179, and a rotation matrix part 180. A quaternion conversion part 181 for converting the rotation matrix calculated by the rotation matrix part 180 into a quaternion is arranged at a subsequent stage of the rotation matrix part 180.

The smoothing part 171 performs an operation for smoothing or averaging final scalar quantities of the x axis, the y axis, and the z axis of the acceleration components output from the acceleration sensor 130. The magnitude of the vector components output from the acceleration sensor 130 can be calculated by multiplying the components of the x axis, the y axis, and the z axis by the acceleration correction coefficient $\alpha$ obtained by Eqs. (9) and (10). However, in the embodiment of the present disclosure, in order to make the vector components gentle, i.e., to smooth the vector components, a scalar quantity $R_{G20}$ of the x axis, a scalar quantity $R_{G21}$ of the y axis, and a scalar quantity $R_{G22}$ of the z axis of the gyro sensor 110 are added to the x axis, the y axis, and the z axis of the acceleration sensor 130, respectively. The gyro sensor 110 senses the angular velocity, and the acceleration sensor 130 senses the acceleration. The acceleration can be calculated by differentiating the angular velocity. That is to say, a predetermined relationship is established between the output of the gyro sensor 110 and the output of the acceleration sensor 130. In view of this, in one embodiment of the present disclosure, the output of the acceleration sensor 130 is smoothed by adding the output of the gyro sensor 110 to the output of the acceleration sensor 130 at a predetermined ratio. Here, the respective smoothed components $R_{20}$, $R_{21}$, and $R_{22}$ of the x axis, the y axis, and the z axis of the acceleration sensor 130 are calculated using Eq. (15). The symbol $\alpha$ is the acceleration correction coefficient $\alpha$ obtained by Eq. (9) or (10).

$$R_{20} = (1-\alpha)R_{G20} + \alpha A_x,\ R_{21} = (1-\alpha)R_{G21} + \alpha A_y,\ R_{22} = (1-\alpha)R_{G22} + \alpha A_z \qquad \text{Eq. (15)}$$

The normalization part 172 is means for normalizing the smoothed components $R_{20}$, $R_{21}$, and $R_{22}$ calculated by Eq. (15). Normalization is means for transforming an output based on a certain rule to make the output easy to use. Normalization of the acceleration components is performed for vector operation, i.e., an outer product operation, of the geomagnetic components. Normalization of the smoothed components $R_{20}$, $R_{21}$, and $R_{22}$ is obtained based on the following Eq. (16).

$$\widetilde{R_{20}} = \frac{R_{20}}{\sqrt{R_{20}^2 + R_{21}^2 + R_{22}^2}}, \qquad \text{Eq. (16)}$$

-continued $$\widetilde{R_{21}} = \frac{R_{21}}{\sqrt{R_{20}^2 + R_{21}^2 + R_{22}^2}}, \widetilde{R_{22}} = \frac{R_{22}}{\sqrt{R_{20}^2 + R_{21}^2 + R_{22}^2}}$$

The outer product operation part 173 calculates a vector component in the x axis direction, i.e., the east direction, expressed in FIG. 2 by the outer product operation of the geomagnetic components and the acceleration components. Assuming that the vector components of the x axis, the y axis, and the z axe in the east direction are $H_x$, $H_y$, and $H_z$, respectively, $H_x$, $H_y$, and $H_z$ may be calculated by Eq. (17) by applying the values obtained by Eq. (15) to Eq. (16).

$$H_x = B_y \widetilde{R_{22}} - B_z \widetilde{R_{21}}, H_y = B_z \widetilde{R_{20}} - B_x \widetilde{R_{22}}, H_z = B_x \widetilde{R_{21}} - B_y \widetilde{R_{20}} \quad \text{Eq. (17)}$$

The normalization part 174 is means for normalizing the respective components of the x axis, the y axis, and the z axis in the east direction calculated by Eq. (17), and may perform the normalization based on Ea. (18).

$$\widetilde{H_x} = \frac{H_x}{\sqrt{H_x^2 + H_y^2 + H_z^2}}, \quad \text{Eq. (18)}$$

$$\widetilde{H_y} = \frac{H_y}{\sqrt{H_x^2 + H_y^2 + H_z^2}}, \widetilde{H_z} = \frac{H_z}{\sqrt{H_x^2 + H_y^2 + H_z^2}}$$

The smoothing part 175 is means for performing an operation for averaging final scalar quantities of the respective components of the x axis, the y axis, and the z axis output from the geomagnetic sensor 120. The respective smoothed components $R'_{00}$, $R'_{01}$, and $R'_{02}$ may be obtained by the following Eq. (19) using Eq. (18) representing the normalized components in the east direction, where β denotes one of the geomagnetic correction coefficient $β_0$ obtained by Eq. (11) and the geomagnetic correction coefficient $β_1$ obtained by Eq. (13). In Eq. (19), the scalar quantities of the x axis, the y axis, and the z axis of the gyro sensor 110 are respectively denoted by $R_{G,00}$, $R_{G,01}$, and $R_{G,02}$.

$$R'_{00} = (1-β)R_{G,00} + β\widehat{H_x}, R'_{01} = (1-β)R_{G,01} + β\widehat{H_y},$$
$$R'_{02} = (1-β)R_{G,02} + β\widehat{H_z} \quad \text{Eq. (19)}$$

The normalization part 176 is means for normalizing the components of the geomagnetic sensor 120 calculated by the smoothing part 175. As described above, normalization is means for transforming an output based on a certain rule to make the output easy to use, and normalization of the geomagnetic components is performed for an orthogonalization at the subsequent stage. The normalization of the components of the geomagnetic sensor 120 calculated by the smoothing part 175 may be performed based on the following Eq. (20).

$$\widetilde{R'_{00}} = \frac{R'_{00}}{\sqrt{R_{00}'^2 + R_{01}'^2 + R_{02}'^2}}, \quad \text{Eq. (20)}$$

$$\widetilde{R'_{01}} = \frac{R'_{01}}{\sqrt{R_{00}'^2 + R_{01}'^2 + R_{02}'^2}}, \widetilde{R'_{02}} = \frac{R'_{02}}{\sqrt{R_{00}'^2 + R_{01}'^2 + R_{02}'^2}}$$

The orthogonalization part 177 performs an orthogonalization of the respective components $R_{00}$, $R_{01}$, and $R_{02}$ of the x axis, the y axis and the z axis in the east direction and finally obtains the posture angle of the gyro sensor 110. The orthogonalization is performed based on Eq. (21) with reference to Eqs. (7), (8), (19), and (20).

$$R_{00} = \widetilde{R'_{00}} - \frac{A_x \widetilde{R'_{00}} + A_y \widetilde{R'_{01}} + A_z \widetilde{R'_{02}}}{A_x^2 + A_y^2 + A_z^2} \cdot A_x, \quad \text{Eq. (21)}$$

$$R_{01} = \widetilde{R'_{01}} - \frac{A_x \widetilde{R'_{00}} + A_y \widetilde{R'_{01}} + A_z \widetilde{R'_{02}}}{A_x^2 + A_y^2 + A_z^2} \cdot A_y,$$

$$R_{02} = \widetilde{R'_{02}} - \frac{A_x \widetilde{R'_{00}} + A_y \widetilde{R'_{01}} + A_z \widetilde{R'_{02}}}{A_x^2 + A_y^2 + A_z^2} \cdot A_z$$

However, the rotation matrix, which is corrected by the above-described various operations using various correction coefficients, may not be a correct rotation matrix. This is because normalization and orthogonalization have not been performed. The output of the gyro sensor 110 can be properly corrected by such a combination of orthogonalization and normalization, i.e., the normalization and orthogonalization.

The normalization part 178 is means for normalizing the orthogonalized values obtained by Eq. (21), and the normalization is performed in order to improve precision of the outer product operation at the subsequent stage. The normalization by the normalization part 178 may be performed based on the following Eq. (22).

$$\widetilde{R_{00}} = \frac{R_{00}}{\sqrt{R_{00}^2 + R_{01}^2 + R_{02}^2}}, \quad \text{Eq. (22)}$$

$$\widetilde{R_{01}} = \frac{R_{01}}{\sqrt{R_{00}^2 + R_{01}^2 + R_{02}^2}}, \widetilde{R_{02}} = \frac{R_{02}}{\sqrt{R_{00}^2 + R_{01}^2 + R_{02}^2}}$$

The outer product operation part 179 is means for obtaining the vector components of the geomagnetic sensor 120 from the outer product operation of the output of the acceleration sensor 130 and the output of the gyro sensor 110. The vector components of the geomagnetic sensor 120 may be calculated by the following Eq. (23) using Eqs. (22) and (16).

$$\widetilde{R_{10}} = \widetilde{R_{21}} \widetilde{R_{02}} - \widetilde{R_{22}} \widetilde{R_{01}}, \widetilde{R_{11}} = \widetilde{R_{22}} \widetilde{R_{00}} - \widetilde{R_{20}} \widetilde{R_{02}}, \widetilde{R_{12}} = \widetilde{R_{20}} \widetilde{R_{01}} - \widetilde{R_{21}} \widetilde{R_{00}} \quad \text{Eq. (23)}$$

The rotation matrix operation part 180 calculates a rotation matrix R expressed in the following Eq. (24) using the respective components calculated by the above Eqs. (16), (22), and (23). The rotation matrix R expressed in Eq. (24) may be obtained by adding the acceleration correction coefficient α and the geomagnetic correction coefficient β.

$$R = \begin{pmatrix} \widetilde{R_{00}} & \widetilde{R_{01}} & \widetilde{R_{10}} \\ \widetilde{R_{10}} & \widetilde{R_{11}} & \widetilde{R_{12}} \\ \widetilde{R_{20}} & \widetilde{R_{22}} & \widetilde{R_{22}} \end{pmatrix}_{PI} \quad \text{Eq. (24)}$$

The rotation matrix R expressed in Eq. (24) may be replaced as a new rotation matrix $R_G$ of the gyro sensor 110.

The rotation matrix R expressed in Eq. (24) is a matrix calculated by the normalization and orthogonalization of the acceleration components and the geomagnetic components as described above. Accordingly, Eq. (24) is the same as Eq. (25) in which rows and columns of Eq. (24) are interchanged $$R_t = \begin{pmatrix} \widetilde{R_{00}} & \widetilde{R_{10}} & \widetilde{R_{20}} \\ \widetilde{R_{01}} & \widetilde{R_{11}} & \widetilde{R_{21}} \\ \widetilde{R_{02}} & \widetilde{R_{12}} & \widetilde{R_{22}} \end{pmatrix}_{Pt1} \qquad \text{Eq. (25)}$$

Therefore, both a first column P1 of Eq. (24) and a first column Pt1 of Eq. (25) become, for example, one. The same applies to a second column and a third column of Eqs. (24) and (25).

The quaternion conversion part 181 is means for converting the rotation matrix R expressed in Eq. (24) or the rotation matrix Rt expressed in Eq. (25) again into a quaternion. The operation in the quaternion conversion part 181 is substantially equivalent to the rotation matrix R expressed in Eq. (24) or the rotation matrix Rt expressed in Eq. (25). A program or algorithm for mutual conversion between the rotation matrix and the quaternion are already known. By converting the rotation matrix into a quaternion, it is possible to reduce the number of operations and shorten the processing time. Thus, it is possible to accurately and quickly calculate a posture angle of the positioning system 100.

Although the gyro sensor output correction part 170 illustrated in FIG. 1 first performs smoothing of the acceleration components, it may be configured such that smoothing of the geomagnetic components is first performed and then smoothing of the acceleration components is performed. In addition, a complementary filter or a Kalman filter may be installed at the subsequent stage of the gyro sensor 110 and the acceleration sensor 130. Also, although the normalization and orthogonalization are illustrated to be separately performed, the normalization and orthogonalization may be performed at the same time.

The operation of the positioning system 100 according to the embodiment of the present disclosure has been described above with reference to FIGS. 1 to 3. Next, a positioning method according to an embodiment of the present disclosure will be described.

Figure 4:
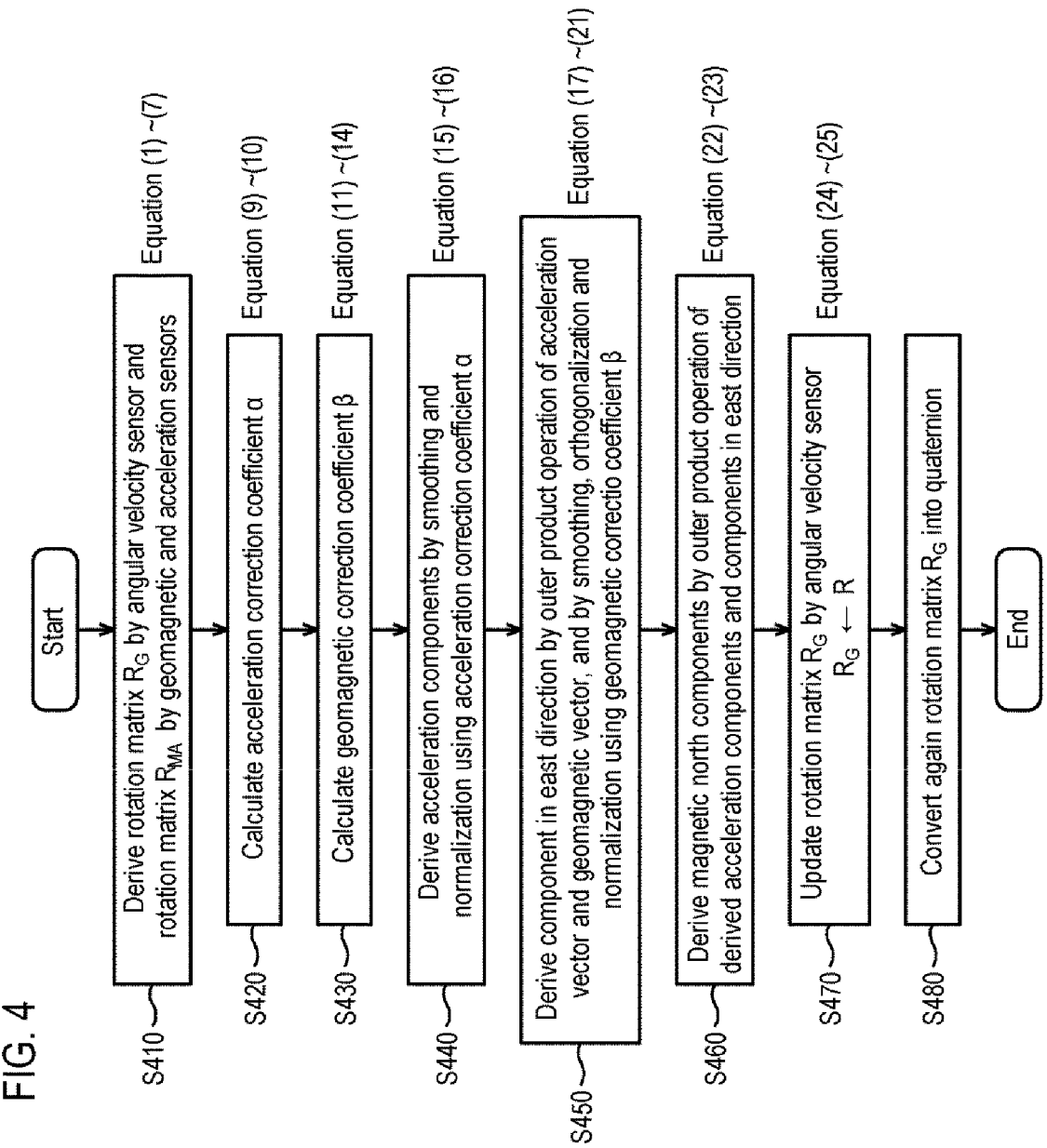
FIG. 4 is a flowchart illustrating a positioning method according to an embodiment of the present disclosure.

FIG. 4 illustrates respective steps (a positioning process) of a method of positioning a moving body or the like according to an embodiment of the present disclosure. Hereinafter, the positioning method will be described with reference to FIGS. 1 to 3. The positioning method according to an embodiment of the present disclosure begins in step S410 and ends in step S480. Equation numbers (1) to (25) described in respective steps are intended to promote the understanding of the positioning method according to the embodiment of the present disclosure and should be interpreted as a reference only.

In step S410, the output of the gyro sensor 110 is expressed by a quaternion by the quaternion derivation part 140, and the expression of the quaternion is converted into a rotation matrix by the first rotation matrix derivation part 150. A feature of the rotation matrix is that the posture of the moving body can be relatively easily expressed. Further, in step S410, the vector $B=(B_x, B_y, B_z)$ extracted from the geomagnetic sensor 120 and the vector $A=(A_x, A_y, A_z)$ extracted from the acceleration sensor 130 are derived as the rotation matrix $R_{MA}$ by the second rotation matrix derivation part 160. In step S410, the rotation matrix is finally expressed by, for example, Eq. (7), through the operations expressed by, for example, Eqs. (1) to (6).

In step S420, the acceleration correction coefficient α for correcting the output of the gyro sensor 110 is calculated using the output of the acceleration sensor 130. The calculation of the acceleration correction coefficient α is performed based on the above Eq. (9) or (10). The acceleration correction coefficient α is α=0 to 1.0, which varies according to the type of the moving body, a use environment of the moving body, or the like. In some embodiments, the acceleration correction coefficient α may be set in an initial stage and may also be changed during the use. A maximum value of the acceleration correction coefficient α, i.e., a maximum acceleration correction coefficient $\alpha_{max}$, is usually 1.0, but may be set smaller than 1.0 in actual practice. In step S420, the operations expressed in, for example, Eqs. (9) and (10) are performed.

In step S430, the geomagnetic correction coefficient β for correcting the output of the gyro sensor 110 using the output of the geomagnetic sensor 120 is calculated. The calculation of the geomagnetic correction coefficient β is performed by, for example, a method using a ratio of the output of the geomagnetic sensor 120 to a peripheral magnetic field after magnetic offset correction. Another method may be used to obtain the geomagnetic correction coefficient β using a ratio of the dip angle γ to the dip angle $\gamma_0$ after magnetic offset correction. In step S430, various operations are performed using, for example, Eqs. (11) to (14).

In step S440, the output components of the acceleration sensor 130 are smoothed and further normalized using the acceleration correction coefficient α calculated in step S420. For normalization, the smoothing expressed by, for example, Eq. (15), is first performed and then normalization is performed using Eq. (16).

In step S450, vector components in the east direction (see FIG. 2) are normalized by the smoothing, the orthogonalization, and the normalization using the outer product operation of the acceleration vector and the geomagnetic vector, and the geomagnetic correction coefficient. The vector components in the east direction are calculated by, for example, applying the operation result based on Eq. (21) to Eq. (22). In step S450, the operations before reaching Eq. (22) are performed based on, for example, Eqs. (17) to (21).

In step S460, the rotation matrix components of a magnetic north are derived by the smoothing, the orthogonalization, and the normalization using the outer product operation of the acceleration sensor 130 and the geomagnetic sensor 120, and the geomagnetic correction coefficient. The vector components in the east direction are derived by Eq. (23).

In step S470, the rotation matrix R on the side of the gyro sensor 110 is updated with the rotation matrix $R_G$. The rotation matrix is expressed by Eq. (24) or (25). Step S470 is not an essential step, and the process may proceed directly from step S460 to step S480.

In step S480, the updated rotation matrix $R_G$ is converted again into a quaternion to obtain the posture angle or the like of the moving body. The reason that the rotation matrix expressed by Eq. (24) or (25) is converted into a quaternion in step S480 is that it is not easy to express the posture angle in the rotation matrix and that the quaternion is expressed by four numerical values and such reduced number of numerical values shortens the operation processing time. Step S480 is not an essential step like step S470, and thus step S480 may be omitted if step S470 is performed. The positioning method according to an embodiment of the present disclosure ends by steps S410 to S480 as described above. The order of various operations performed in steps S410 to S480 is arbitrary except for steps S470 and S480. For example, steps S420 and S430 may be interchanged. Also, the processing order of steps S440 to S460 may be changed.

In addition, all of steps S410 to S480 may not be essential, and for example, at least one of steps S420 and S430 may be skipped depending on the type of the moving body, the use environment of the moving body, or the like.

In short, the features of the positioning system and the positioning method according to an embodiment of the present disclosure are correcting the output of the gyro sensor by performing the smoothing, the normalization, and the orthogonalization on the acceleration components and the geomagnetic components of the moving body, obtaining the rotation matrix, and converting the rotation matrix into a quaternion, thereby measuring the posture of the moving body or the like.

Figure 5:
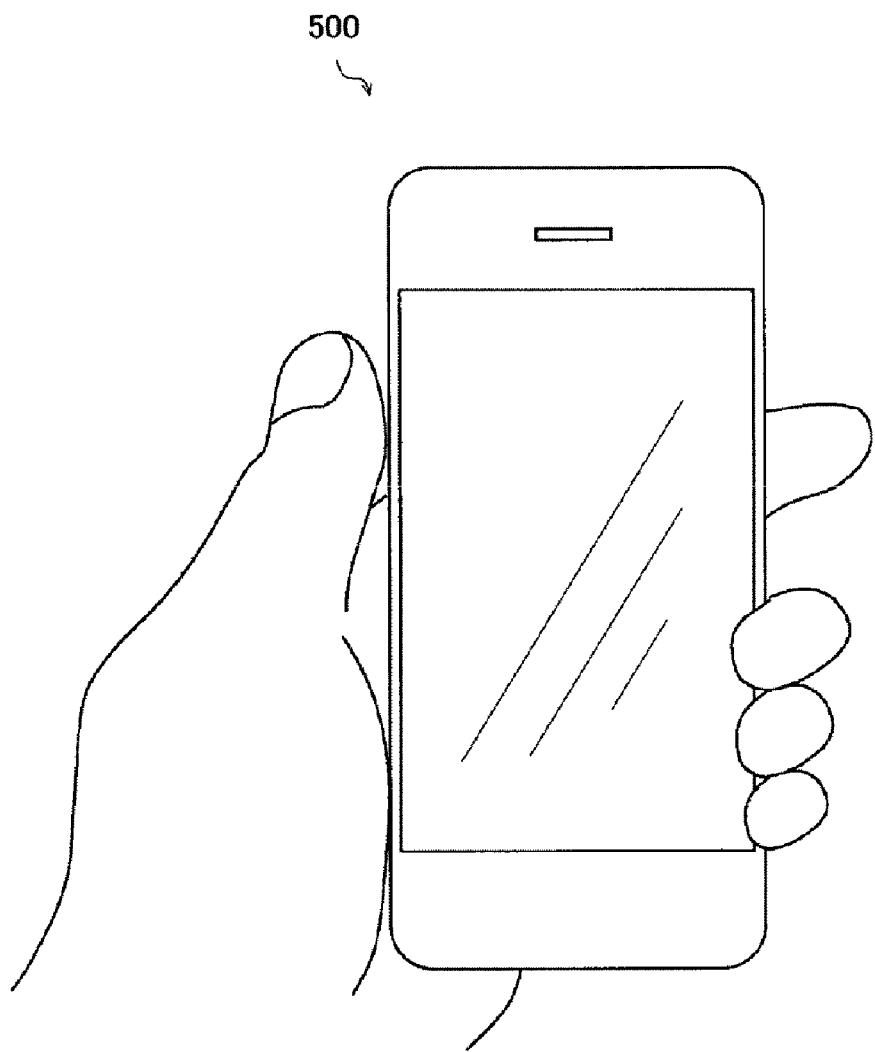
FIG. 5 is an external view of a smartphone equipped with a positioning system according to an embodiment of the present disclosure.
Figure 6:
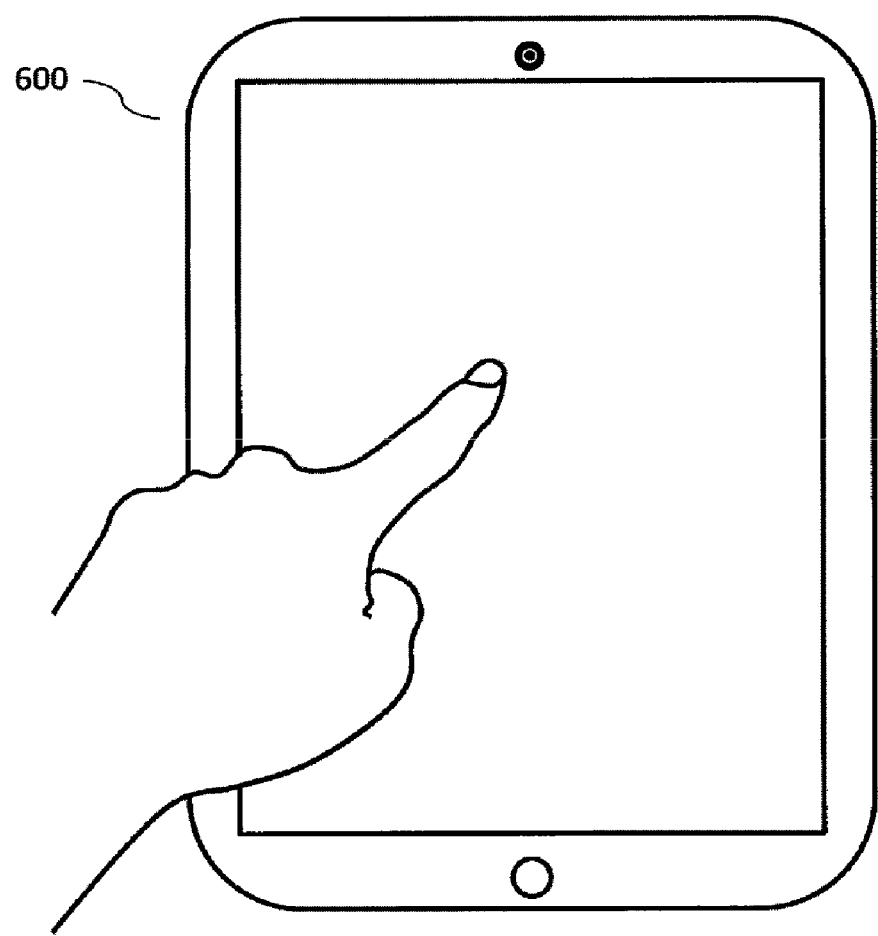
FIG. 6 is an external view of a tablet terminal equipped with a positioning system according to an embodiment of the present disclosure.
Figure 7:
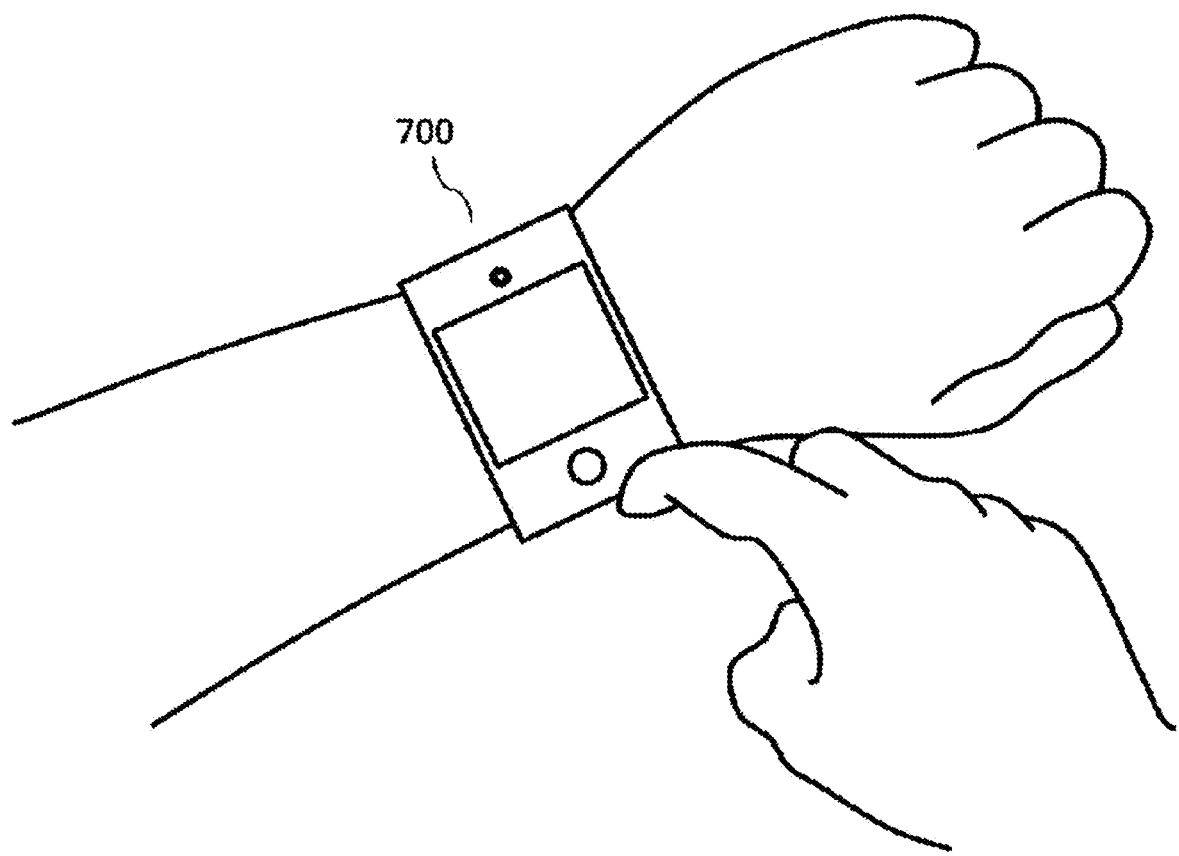
FIG. 7 is an external view of a smart watch equipped with a positioning system according to an embodiment of the present disclosure.
Figure 8:
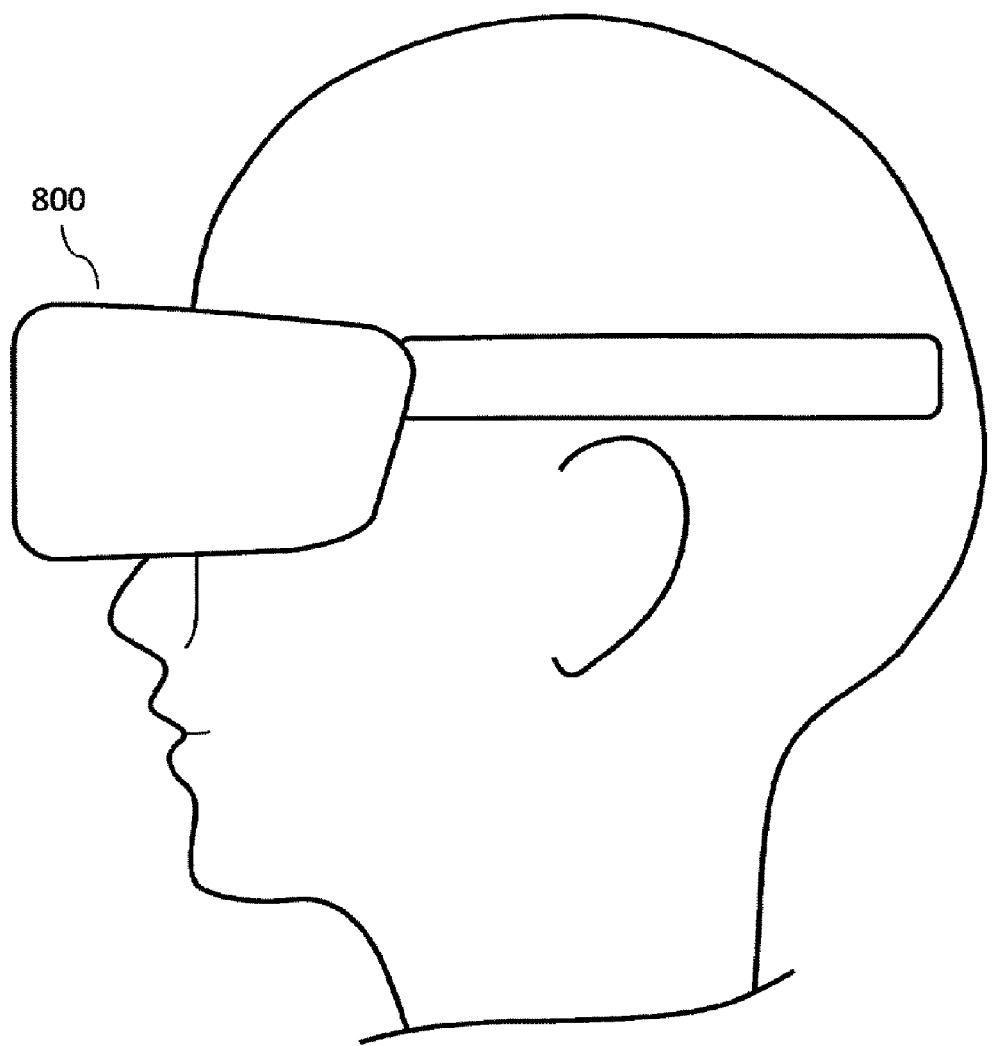
FIG. 8 is an external view of an augmented reality device or a virtual reality device equipped with a positioning system according to an embodiment of the present disclosure.
Figure 9:
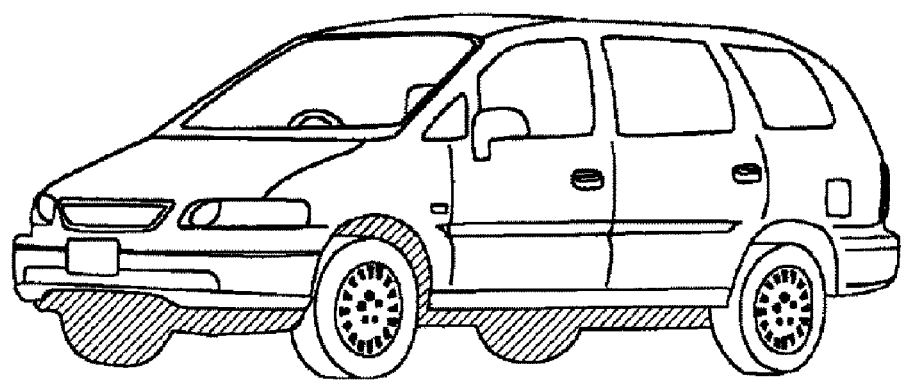
FIG. 9 is an external view of a vehicle equipped with a positioning system according to an embodiment of the present disclosure.
Figure 10:
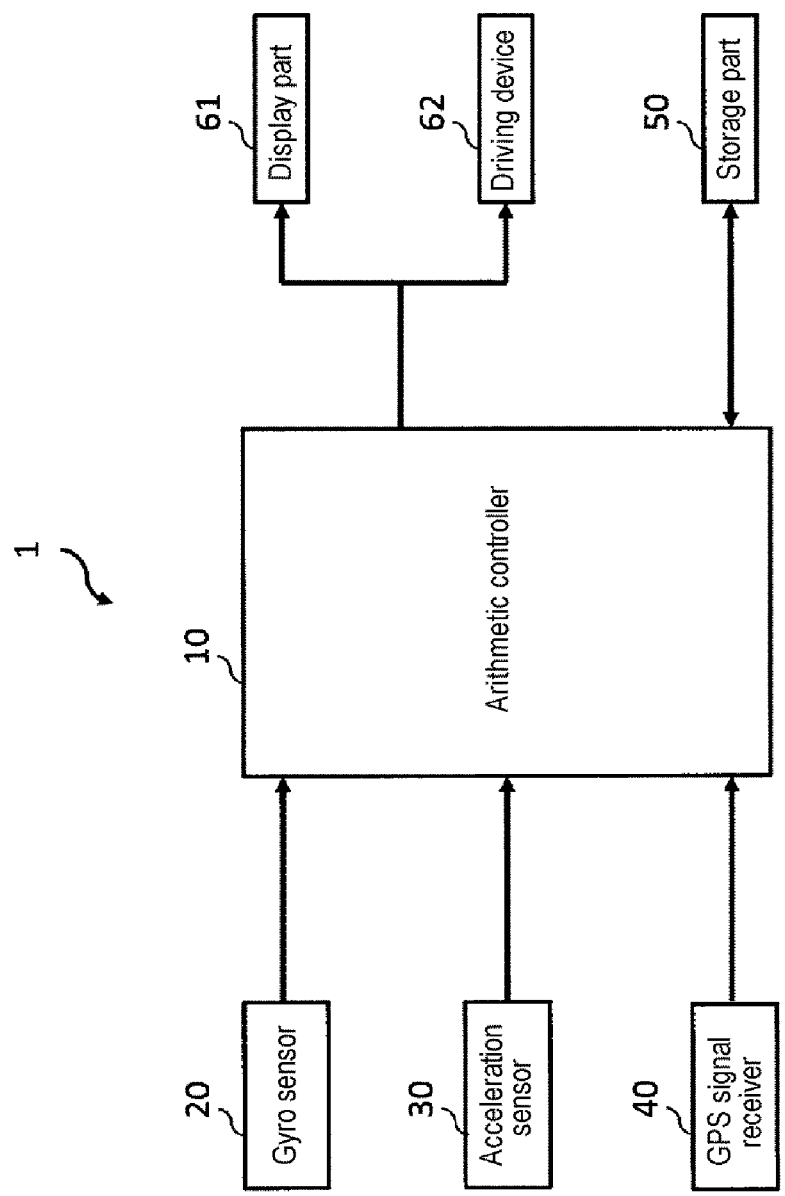
FIG. 10 is a block diagram illustrating an example of a conventional positioning system.

FIGS. 5 to 9 are external views of various electronic devices, vehicles, and the like on which the positioning system of an embodiment of the present disclosure is mounted. FIG. 5 illustrates a smartphone 500, FIG. 6 illustrates a tablet terminal 600, FIG. 7 illustrates a smart watch 700, FIG. 8 illustrates an AR/VR device 800, and FIG. 9 illustrates a vehicle 900. For example, the positioning system 100 is mounted on the smart watch 700 in FIG. 7 in order to perform trajectory analysis of, for example, an arm. In addition to the foregoing, the positioning system or the positioning method according to an embodiment of the present disclosure is mounted on an aircraft, a ship, a digital camera, a game machine, or the like, and is used for applications that detect a change in the rotation or direction of these moving bodies.

As described above, the present disclosure can accurately recognize a location, a velocity, a posture or the like of a moving body even when the moving body is in a tunnel or in a stationary state, which reduces accuracy of GPS measurement data. Thus, the present disclosure has high industrial applicability.

According to the positioning system and the positioning method of the present disclosure in some embodiments, it is possible to accurately obtain an azimuth angle and an inclination angle of a moving body located under an environment where a GPS signal cannot be received, based on an output of a gyro sensor and based on outputs of a geomagnetic sensor and an acceleration sensor.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A positioning system, comprising:
a gyro sensor configured to detect an angular velocity of a moving body;
a geomagnetic sensor configured to detect a direction in which the moving body is placed;
an acceleration sensor configured to detect an acceleration of the moving body; and
a controller configured to correct output components of the gyro sensor, and
wherein the controller is configured to perform normalization and orthogonalization on the output components of the gyro sensor by adding output components of the geomagnetic sensor and output components of the acceleration sensor to a part of the output components of the gyro sensor, and then to convert the corrected output components of the gyro sensor into a rotation matrix or a quaternion based on the output components of the geomagnetic sensor and the output components of the acceleration sensor, and to calculate a posture of the moving body based on the rotation matrix or the quaternion.

2. The system of claim 1, wherein the controller is configured to perform at least one of:
expressing the output components of the gyro sensor by a quaternion; and
expressing the output components of the gyro sensor by a rotation matrix, and
wherein the controller is configured to perform the normalization and orthogonalization on at least one of the output components of the gyro sensor expressed by the quaternion and the output components of the gyro sensor expressed by the rotation matrix.

3. The system of claim 2, wherein the controller is configured to express the output components of the geomagnetic sensor and the output components of the acceleration sensor by a rotation matrix, and
wherein the controller is configured to perform the normalization and orthogonalization based on the rotation matrix.

4. The system of claim 1, wherein the controller is configured to perform the normalization and orthogonalization on the output components of the gyro sensor after performing smoothing of the output components of the acceleration sensor and the output components of the geomagnetic sensor.

5. The system of claim 4, wherein the controller is configured to calculate an acceleration correction coefficient $\alpha(0 \le \alpha \le 1.0)$ of the acceleration sensor and reflect the acceleration correction coefficient a on components of the rotation matrix, and configured to calculate a geomagnetic correction coefficient $\beta(0 \le \beta \le 1.0)$ of the geomagnetic sensor and reflect the geomagnetic correction coefficient $\beta$ on the components of the rotation matrix on which the acceleration correction coefficient $\alpha$ is reflected.

6. The system of claim 5, wherein the controller is configured to calculate the acceleration correction coefficient a based on a function of being convex upward, where a value of the acceleration correction coefficient $\alpha$ is maximum when an absolute value of the acceleration is 1.0.

7. The system of claim 5, wherein the controller is configured to reflect a product of the acceleration correction coefficient $\alpha$ and the geomagnetic correction coefficient $\beta$ or a quotient of the acceleration correction coefficient $\alpha$ and the geomagnetic correction coefficient $\beta$ on the components of the rotation matrix.

8. The system of claim 7, wherein the controller is configured to calculate vector components in a direction orthogonal to a magnetic north, the vector components being obtained from output vector components of the acceleration sensor and output vector components of the geomagnetic sensor by an outer product operation of the output vector components of the acceleration sensor and the output vector components of the geomagnetic sensor.

9. The system of claim 8, wherein the controller is configured to calculate vector components of the magnetic north by the outer product operation of the output vector components of the acceleration sensor and the vector components in the direction orthogonal to the magnetic north.

10. The system of claim 8, wherein the controller is configured to:

calculate a scalar quantity $|\vec{A}|$ of the output vector components of the acceleration sensor by the following equation (8):

$$|\vec{A}| = \sqrt{A_x^2 + A_y^2 + A_z^2} \qquad \text{Eq. (8)}$$

where $A_x$, $A_y$, and $A_z$ denote an x axis component, a y axis component, and a z axis component, respectively, of the output vector components of the acceleration sensor;

calculate the acceleration correction coefficient α by one of the following equations (9) and (10):

$$\alpha = \frac{\alpha_{max}}{1 + c_0(1.0 - |\vec{A}|)^2}, \qquad \text{Eq. (9)}$$

$$\alpha = \alpha_{max} \operatorname{sech}\{c_0(1.0 - |\vec{A}|)\} \qquad \text{Eq. (10)}$$

where $c_0$ is a constant and $\alpha_{max}$ is a maximum acceleration correction coefficient; and correct the output components of the gyro sensor using the acceleration correction coefficient α.

11. The system of claim 10, wherein the controller is configured to smooth the output vector components of the acceleration sensor by the following equation (15):

$$R_{20} = (1-\alpha)R_{G20} + \alpha A_x,\ R_{21} = (1-\alpha)R_{G21} + \alpha A_y,\ R_{22} = (1-\alpha)R_{G22} + \alpha A_z \qquad \text{Eq. (15)}$$

where $R_{20}$, $R_{21}$, and $R_{22}$ denote an x axis component, a y axis component, and a z axis component, respectively, of smoothed output vector components of the acceleration sensor, and $R_{G20}$, $R_{G21}$, and $R_{G22}$ denote an x axis component, a y axis component, and a z axis component, respectively, of output vector components of the gyro sensor.

12. The system of claim 11, wherein the controller is configured to:

normalize the smoothed output vector components of the acceleration sensor by the following equation (16):

$$\widetilde{R_{20}} = \frac{R_{20}}{\sqrt{R_{20}^2 + R_{21}^2 + R_{22}^2}}, \qquad \text{Eq. (16)}$$

$$\widetilde{R_{21}} = \frac{R_{21}}{\sqrt{R_{20}^2 + R_{21}^2 + R_{22}^2}},\ \widetilde{R_{22}} = \frac{R_{22}}{\sqrt{R_{20}^2 + R_{21}^2 + R_{22}^2}};$$

and obtain the vector components in the direction orthogonal to the magnetic north by performing the outer product operation expressed by the following equation (17):

$$H_x = B_y \widetilde{R_{22}} - B_z \widetilde{R_{21}},\ H_y = B_z \widetilde{R_{20}} - B_x \widetilde{R_{22}},\ H_z = B_x \widetilde{R_{21}} - B_y \widetilde{R_{20}} \qquad \text{Eq. (17)}$$

where $H_x$, $H_y$, and $H_z$ denote an x axis component, a y axis component, and a z axis component, respectively, of the vector components in the direction orthogonal to the magnetic north, and $B_x$, $B_y$, $B_z$ denote an x axis component, a y axis component, and a z axis component, respectively, of the output vector components of the geomagnetic sensor.

13. The system of claim 12, wherein the controller is configured to normalize the vector components in the direction orthogonal to the magnetic north obtained by the outer product operation based on the following equation (18):

$$\widehat{H_x} = \frac{H_x}{\sqrt{H_x^2 + H_y^2 + H_z^2}}, \qquad \text{Eq. (18)}$$

$$\widehat{H_y} = \frac{H_y}{\sqrt{H_x^2 + H_y^2 + H_z^2}},\ \widehat{H_z} = \frac{H_z}{\sqrt{H_x^2 + H_y^2 + H_z^2}}$$

where $\widehat{H_x}$, $\widehat{H_y}$, and $\widehat{H_z}$ denote normalized vector components in the direction orthogonal to the magnetic north.

14. The system of claim 13, wherein the controller is configured to:

calculate a geomagnetic correction coefficient $\beta_0$ by the following equation (11):

$$\beta_0 = 1 - \frac{|\vec{B}|}{|\vec{B_0}|} \qquad \text{Eq. (11)}$$

where $B_0$ denotes a magnetic field vector of the geomagnetic sensor after a magnetic offset correction, and B denotes a vector of an external magnetic field before the correction; and smooth the vector components in the direction orthogonal to the magnetic north based on the following equation (19):

$$R'_{00} = (1-\beta)R_{G,00} + \beta \widehat{H_x},\ R'_{01} = (1-\beta)R_{G,01} + \beta \widehat{H_y},$$

$$R'_{02} = (1-\beta)R_{G,02} + \beta \widehat{H_z} \qquad \text{Eq. (19)}$$

where $R'_{00}$, $R'_{01}$, and $R'_{02}$ denote smoothed vector components in the direction orthogonal to the magnetic north, β denotes the geomagnetic correction coefficient $\beta_0$, and $R_{G,00}$, $R_{G,01}$, and $R_{G,02}$ denote an x axis component, a y axis component, and a z axis component, respectively, of output vector components of the gyro sensor.

15. The system of claim 14, wherein the controller is configured to:

normalize the smoothed vector components in the direction orthogonal to the magnetic north based on the following equation (20):

$$\widetilde{R'_{00}} = \frac{R'_{00}}{\sqrt{R'^2_{00} + R'^2_{01} + R'^2_{02}}}, \qquad \text{Eq. (20)}$$

$$\widetilde{R'_{01}} = \frac{R'_{01}}{\sqrt{R'^2_{00} + R'^2_{01} + R'^2_{02}}},\ \widetilde{R'_{02}} = \frac{R'_{02}}{\sqrt{R'^2_{00} + R'^2_{01} + R'^2_{02}}};$$

and orthogonalize the smoothed vector components in the direction orthogonal to the magnetic north based on the following equation (21):

$$R_{00} = \widetilde{R'_{00}} - \frac{A_x \widetilde{R'_{00}} + A_y \widetilde{R'_{01}} + A_z \widetilde{R'_{02}}}{A_x^2 + A_y^2 + A_z^2} \cdot A_x, \qquad \text{Eq. (21)}$$

$$R_{01} = \widetilde{R'_{01}} - \frac{A_x \widetilde{R'_{00}} + A_y \widetilde{R'_{01}} + A_z \widetilde{R'_{02}}}{A_x^2 + A_y^2 + A_z^2} \cdot A_y,$$

$$R_{02} = \widetilde{R'_{02}} - \frac{A_x \widetilde{R'_{00}} + A_y \widetilde{R'_{01}} + A_z \widetilde{R'_{02}}}{A_x^2 + A_y^2 + A_z^2} \cdot A_z$$

where $A_x$, $A_y$, and $A_z$ denote the output vector components of the acceleration sensor.

16. The system of claim 15, wherein the controller is configured to:

normalize the orthogonalized vector components in the direction orthogonal to the magnetic north by the following equation (22)

$$\bar{R}_{00} = \frac{R_{00}}{\sqrt{R_{00}^2 + R_{01}^2 + R_{02}^2}}, \quad \text{Eq. (22)}$$

$$\bar{R}_{01} = \frac{R_{01}}{\sqrt{R_{00}^2 + R_{01}^2 + R_{02}^2}}, \bar{R}_{02} = \frac{R_{02}}{\sqrt{R_{00}^2 + R_{01}^2 + R_{02}^2}};$$

and calculate vector components of the magnetic north by the following equation (23):

$$\widetilde{R_{10}} = \widetilde{R_{21}} \widetilde{R_{02}} - \widetilde{R_{22}} \widetilde{R_{01}}, \widetilde{R_{11}} = \widetilde{R_{22}} \widetilde{R_{00}} - \widetilde{R_{20}} \widetilde{R_{02}}, \widetilde{R_{12}} = \widetilde{R_{20}} \widetilde{R_{01}} - \widetilde{R_{21}} \widetilde{R_{00}} \quad \text{Eq. (23)}$$

where equation (23) is an outer product operation of normalized values of the smoothed output vector components of the acceleration sensor and the normalized values of the orthogonalized vector components in the direction orthogonal to the magnetic north.

17. The system of claim 16, wherein the controller is configured to convert the output components of the gyro sensor to a rotation matrix R that is equivalent to the following equation (24):

$$R = \begin{pmatrix} \widetilde{R_{00}} & \widetilde{R_{01}} & \widetilde{R_{02}} \\ \widetilde{R_{10}} & \widetilde{R_{11}} & \widetilde{R_{12}} \\ \widetilde{R_{20}} & \widetilde{R_{21}} & \widetilde{R_{22}} \end{pmatrix} \quad \text{Eq. (24)}$$

where equation (24) is based on the normalized values of the orthogonalized vector components in the direction orthogonal to the magnetic north, the vector components of the magnetic north, and the normalized values of the smoothed output vector components of the acceleration sensor.

18. A method of positioning a moving body comprising a gyro sensor configured to detect an angular velocity of the moving body, a geomagnetic sensor configured to detect a direction in which the moving body is placed, an acceleration sensor configured to detect an acceleration of the moving body, and a controller configured to correct an output of the gyro sensor, the method comprising:

correcting, by the controller, output components of the gyro sensor based on outputs of the geomagnetic sensor and the acceleration sensor; and performing, by the controller, normalization and orthogonalization on the output components of the gyro sensor by adding the output of the geomagnetic sensor and the output of the acceleration sensor to a part of the output components of the gyro sensor, and then converting, by the controller, the corrected output components of the gyro sensor into a rotation matrix or a quaternion.

19. A moving body comprising a positioning system that comprises:

a gyro sensor configured to detect an angular velocity of the moving body;

a geomagnetic sensor configured to detect a direction in which the moving body is placed;

an acceleration sensor configured to detect an acceleration of the moving body; and a controller configured to correct output components of the gyro sensor, wherein the controller is configured to perform normalization and orthogonalization on the output components of the gyro sensor by adding output components of the geomagnetic sensor and output components of the acceleration sensor to a part of the output components of the gyro sensor, and then to convert the corrected output components of the gyro sensor into a rotation matrix or a quaternion based on the output components of the geomagnetic sensor and the output components of the acceleration sensor, and to calculate a posture of the moving body based on the rotation matrix or the quaternion.

20. The moving body of claim 19, wherein the moving body is any one among an electronic device, a smartphone, a tablet terminal, a smart watch, an augmented reality and virtual reality (AR/VR) device, a camera, a game device, a vehicle, a ship, and an aircraft.

* * * * *